United States Patent [19]
Holt

[11] 3,770,544
[45] Nov. 6, 1973

[54] PRODUCTION OF RESIN BONDED LAMINATES
[75] Inventor: Stanley Holt, Manchester, England
[73] Assignee: Sterling Moulding Materials Limited, London, England
[22] Filed: Apr. 1, 1971
[21] Appl. No.: 130,486

Related U.S. Application Data
[62] Division of Ser. No. 735,192, June 3, 1968, abandoned.

[30] Foreign Application Priority Data
June 8, 1967  Great Britain.................. 26,597/67

[52] U.S. Cl............. 156/306, 117/161 L, 156/307, 156/335, 161/257, 161/264, 260/29.3, 260/51 R, 260/57 A
[51] Int. Cl. ......................... C09j 5/02, B32b 27/42
[58] Field of Search................ 117/161 L; 156/306, 156/307, 335; 161/257, 264; 260/29.3, 51 R, 57 A

[56] References Cited
UNITED STATES PATENTS
2,817,386  12/1957  Counos.......................... 156/335 X Primary Examiner—Alfred L. Leavitt
Assistant Examiner—Robert A. Dawson
Attorney—Wenderoth, Lind & Ponack

[57] ABSTRACT

The invention provides a process for forming a laminate, which process comprises the steps of:
  a. reacting a sytrene with a phenol in the presence of an ionic catalyst to prepare a styrenated phenol,
  b. water washing the styrenated phenol
  c. mixing the washed styrenated phenol with a phenol selected from the group consisting of phenol, cresol and xylenol, and an aldehyde, the weight ratio of phenol to styrenated phenol in the mixture being 95:5 to 30:70
  d. condensing the mixture in the presence of a volatile alkaline condensation catalyst
  e. impregnating fibrous sheets with the resin product thus obtained, drying the impregnated sheets, assembling a plurality of the dried sheets and heating the assembled sheets under pressure to form the desired laminate.

The laminates so produced have good electrical properties.

8 Claims, No Drawings

PRODUCTION OF RESIN BONDED LAMINATES

This application is a division of Ser. No. 735,192, filed June 3, 1968, now abandoned.

This invention relates to improvements in or concerning the production of resin bonded laminates employing modified phenolic resins having improved properties as compared with resins based upon phenol itself.

It is well known to manufacture phenolic resin-type laminates, using cresol-based resins as the impregnant. Laminates made with the use of other conventional phenolic resins do not possess the desired electrical properties. It would be very desirable to replace the cresol component of the cresol-based resins, providing that the good electrical properties of those resins remained at the same satisfactory level or were improved, because of the inconsistency in the quality of natural cresol and its diminishing availability.

It has now been found that in the production of phenolic resins for laminates, cresol may be replaced by a mixture of a phenol and an arylalkyl-substituted phenol to produce an improved phenolic resin for the production of high grade electrical laminates, the said substituted phenol being produced by the reaction of a phenol with styrene or a substituted styrene.

The phenol employed in the preparation of the styrenated phenol and in the resin product is generally phenol itself. However, homologues of phenol, e.g. cresol or xylenol, or mixtures of such materials with phenol, are also suitable and may equally well be used where the greater cost of such materials is not important.

The styrenated phenol employed in the reaction is the reaction product of a phenol with styrene or a substituted styrene, for example, alpha-methyl styrene or vinyl toluene. The reactions of the styrenes with the phenols are well known, and are essentially alkylation reactions in which the vinyl group of the styrene adds ortho or para to the hydroxyl group of the phenol. Catalysts of the ionic type, for example, acids and metallic halides, are generally employed for the reaction. Depending on the reaction conditions, catalysts, and the proportions of the reactants, there may be obtained mono-, di- or tri- styrenated phenols. The tri-styrenated phenols are not readily capable of being cross-linked, and have a plasticising action on the final product.

The styrene should be added gradually to the phenol, preferably at an elevated temperature, in the presence of a catalytic amount, for example, from 0.1 percent to 1 percent by weight of the phenol, of a catalyst, e.g. p-toluene sulphonic acid, sulphuric acid, or aluminium chloride. It is preferable to maintain reaction conditions for about 30 minutes after completion of the addition of styrene to ensure complete reaction, although the reaction commences instantaneously with the addition of the styrene.

The proportion of styrene reacted with the phenol is not critical, good electrical properties being obtained with from 50 to 300 parts by weight of the styrene per 100 parts of the phenol. When high proportions of styrene to phenol are employed, laminates formed with the resulting modified phenolic resin may be found to have a dull surface finish due to mutual incompatibility of the components of the resin, although their electrical properties are not adversely affected. The particularly preferred ratio of styrene to phenol is from 100 to 160 parts by weight of the styrene per 100 parts of the phenol.

The ionic catalyst can be readily removed from the styrenated phenol by washing. It has been found that it is necessary to effect this removal, as the ionic material otherwise has a damaging effect on the performance of electrical laminates prepared from the modified resins. A styrenated phenol prepared by using an acid catalyst and therefore containing ionic material may be substantially freed of ionic material by being washed with an equal volume of water for five minutes at ambient temperature. More thorough washing, or multiple washes, may of course be used if desired, in order to obtain further improved electrical properties.

When intended for use in the production of laminated products employed in the electrical and radio industries, the condensation with formaldehyde (or other aldehyde) is carried out to the resol stage in which form the condensation product is impregnated into paper or cloth sheets or strips, the latter being then laminated and cured in presses or molds. Where the best electrical properties are required in the laminates, the resol should be substantially free from electrolytes and therefore conventional procedures are followed in the condensation reaction by either using volatile alkaline catalysts or by neutralising the inorganic alkaline catalysts and washing the product so as to remove electrolytes as completely as possible.

Ammonia, or hexamethylenetetramine, is the preferred alkaline catalyst. Formaldehyde is the aldehyde normally employed, but the invention embodies the use of other aldehydes, for example, furfural or acetaldehyde. At least one mole of the aldehyde per mole of the phenolic component is preferably used. When formaldehyde, in the form of formalin (37 percent w/w formaldehyde aqueous solution), is used, it is preferable to employ from 75 to 225 parts of formalin per 100 parts of the mixture of the styrenated phenol and the phenol. When less than 75 parts of formalin is used, the performance of the resulting resin diminishes; the use of more than 225 parts of formalin results in loss of formaldehyde and reduced output per unit time.

The proportion of the phenol to the styrenated phenol which is reacted with the aldehyde must be from 95:5 to 30:70 and is preferably from 80:20 to 40:60. An advantage of the resins of this invention is that the ratio of phenol to styrenated phenol can be varied considerably to give a versatile range of resins with differing properties.

The time taken by the resol to thermoset depends to a large extent on the proportion of styrenated phenol to phenol. When a large proportion of styrenated phenol is used, the gel time is likely to be inconveniently long. When the proportion of phenol is relatively large, the gel time may be inconveniently short and it may be difficult to control the drying of the resol so as to avoid premature thermosetting and an inhomogeneous product. Convenient gel times (measured at 130°C.) are in the range of 10 to 80 minutes.

The phenol, styrenated phenol and aldehyde may be reacted together in various ways. Thus, the aldehyde may be condensed with a mixture of the phenol and the styrenated phenol, or with one of them followed by the addition of the other together with further formalin to the condensation product for further reaction therewith. Alternatively, the condensation products of the phenol and the styrenated phenol may be prepared separately and then blended.

The reaction is preferably carried out by charging the phenol and styrenated phenol into the reaction vessel and subsequently adding formaldehyde and ammonia. Then the temperature is raised and the condensation reaction is carried to the required degree to give a product having the desired properties. The reaction time depends on the styrenated phenol content, but is usually from 60 to 100 minutes at atmospheric pressure at a reflux temperature of about 100°C. The preferred pH range is 7 to 10 and ammonia is the preferred catalyst. Then the product is heated under reduced pressure and solvent is added at that stage or after cooling and solidification.

One or more organic solvents, e.g. toluene, methanol, industrial methylated spirit, ethanol, acetone, or methyl ethyl ketone, or mixtures thereof, are added to the resin to form a varnish having a viscosity which is suitable for impregnating purposes. For impregnating paper, a convenient viscosity at 25°C. is from 30 to 35 cS. For impregnating cloth, a higher viscosity of from 40 to 60 cS. is uaually employed.

Such varnishes can be used to impregnate fibrous sheets, e.g. cellulose paper, asbestos paper and cotton fabric, and are especially valuable for impregnating electrical grade cellulose paper. In this application the paper, optionally pre-impregnated with a minor amount of a low molecular weight liquid pehnolic resin, is impregnated to the desired total resin content (about 45-65 percent), with one of the varnishes of the invention, dried, assembled with a plurality of other plies of thus-treated paper, and heated at temperatures usually in the range of about 130°-180°C. under pressures of, for example, about 1,000 psi. to form a laminate. These laminates are characterised by good electrical properties previously unattainable without the use of cresol-based resin impregnants.

The degree of drying of the impregnated sheets is important. If they are not adequately dried, the resin flows out and leaves the paper before curing takes place. If they are overdried, the laminate cures without sufficient flow and is inhomogeneous. It is preferable to dry the impregnated sheets to a volatile content of from 2.5 to 5.0 percent. However the optimum conditions in any particular case can only be found by experience.

The resin content of the impregnated sheets may be chosen to provide the desired electrical properties. It has been found that a resin content of from 48 to 51 percent is frequently sufficient to pass British Standard Specification No. 1137 of 1966 for Type I Sheets.

In the various applications in which the resins of the present invention can be used, they can be modified by conventional additives, e.g. fillers, plasticizers, and flame-retardants.

The following examples illustrate the manner in which the invention may be carried into effect:

EXAMPLE 1

A. First the styrenated phenol is made by reacting the following:

| | |
|---|---|
| Phenol | 470 parts |
| Styrene | 520 parts |
| p-toluene sulphonic acid | 1.25 parts |

The phenol and p-toluene sulphonic acid are charged into a reaction vessel, then the temperature is raised to 130°C., and the styrene is added gradually over a period of 2 hours. Then the temperature is taken up to 135°C. and this is maintained for 30 minutes. The mixture is cooled to 70°C. and soda ash solution is added (0.25 part soda ash in 5 parts of hot water). Cool to 30°C. in 20 minutes. Add wash water (500 parts) and wash. Stop the stirrer and allow to settle, then remove upper aqueous layer.

B. The thus-prepared styrenated phenol is used in preparing a range of resins using the following basec formulation:

A. (Phenol (m.p. 40° – 41°C.) to a total of 100 parts (Styrenated Phenol)

B. (Formaldehyde 110 parts (37% w/w aqueous solution)

(Ammonia 3.84 parts (25% w/w aqueous solution)

Charge A first and then stir for 3 minutes. Now add B and raise the temperature to reflux temperature and continue refluxing for seventy minutes at atmospheric pressure. Then the reaction mixture is distilled under vacuum (using 100 to 150 mm. of mercury pressure) to an end temperature of 92°C. and the dehydrated resin is dissolved in 105 parts of industrial methylated spirits. The following table shows the proportions of the phenol and styrenated phenol employed in producing a variety of resins.

TABLE I

| Experiment | Phenol | Styrenated Phenol | Gel time min. secs. | Viscosity at 25°C.(cS.) |
|---|---|---|---|---|
| 1 | 100 | 0 | 5 30 | 51 |
| 2 | 95 | 5 | 5 50 | 53 |
| 3 | 90 | 10 | 6 30 | 55.5 |
| 4 | 70 | 30 | 19 40 | 29 |
| 5 | 40 | 60 | 80 | 12.8 |
| 6 | 30 | 70 | 135 | 9.6 |
| 7 | 0 | 100 | | 12.3 |

C. In Table II P/F represents the resin produced in Experiment I of Table I and Sp/F represents the resins produced with styrenated phenol according to Table I, Experiment 9 using the resin of Experiment 6 and Experiment 10 using the resin of Experiment 7 respectively.

Table II

| Experiment | P/F | Styrenated Phenol | Sp/F | Gel time min. at 130°C. | Viscosity at 25°C. (cS.) |
|---|---|---|---|---|---|
| 8 | 100 | 30 | — | 13 | 24 |
| 9 | 100 | — | 100 | 21 | 25 |
| 10 | 100 | — | 100 | 17 | 25 |

In Table I the resins were made in accordance with the general description preceding the Table utilising the ingredients in the proportions set out.

In both Table I and Table II the gel time was measured at 130°C. and the viscosity figures are quoted in centistokes at 25°C.; the absence of a gel time in Experiment 7 is due to the fact that the resin did not gel at 130°C. at all.

The experiments in Table Ii were carried out by blending the ingredients set forth in the Table. These blends were found to be useful as impregnating resins and their gel times and viscosities as shown in the Table indicate theire usefulness.

For purposes of comparison it may be noted that for the conventional standard cresol/formaldehyde resin compositions used for producing electrical laminates the gel time is about 18 minutes at 130°C., and the viscosity is about 32 centistokes at 25°C.

D. All the resin compositions of Tables I and II (except those produced in Experiments 1 and 7) produced laminates with Kraft paper which were of good strength and stability and in general exhibited satisfactory electrical properties. The resin composition produced in accordance with Experiment 4 was used to impregnate 5 mil Kraft paper and the impregnated paper was then dried to 50 percent resin content. The impregnated papers were assembled, heated and pressed into laminated boards having a thickness of one-sixteenth of an inch. A standard cresol-based resin was used to prepare, under the same conditions, similar impregnated laminated boards.

The following results were obtained for the two resins:

TABLE III

|  | Resin made as in Example 1 | Standard cresol resin |
| --- | --- | --- |
| Flatwise electric strength at 90°C. | 40 kilovolts | 41 kilovolts |
| Moisture absorption | 23 milligrams | 28 milligrams |
| Surface finish | good | good |

The electric strength was measured by determining the voltage at which the insulation breaks down. The moisture absorption is determined in accordance with the procedure disclosed in British Standard Specification No. 1137 of 1966.

A number of styrenated phenols are prepared, using the procedure of paragraph A of Example 1, but varying the proportions of styrene to phenol, as shown in Table IV.

TABLE IV

| Reactant | Parts by weight: | | | | | |
| --- | --- | --- | --- | --- | --- | --- |
| Phenol | 94 | 94 | 94 | 94 | 94 | 94 |
| Cresol |  |  |  |  | 108 |  |
| Styrene | 56 | 112 | 149 | 193 | 112 | 229 |
| alpha-Methyl styrene |  |  |  |  |  | 120 |
| Product designated | P | Q | R | S | T | U | V |

In Table IV, the cresol used is a mixture containing from 40 to 42 percent of m-cresol.

Table V, below, shows the compositions of a number of resins prepared from the styrenated phenols, and the properties of laminates made using the resins. The resins are mostly prepared according to the procedure described in paragraph B of Example 1. Where this procedure is not followed, the methods of preparation of the resins are:

X — A 100 percent phenol-formaldehyde resin, and also a 40 percent phenol/60 percent styrenated phenol (product Q) - formaldehyde resin are prepared (each by the procedure described in paragraph B of Example 1). Equal weight of the two products are blended together at room temperature as 48 per cent solids solution in industrial methylated spirits.

Y — 100 parts of styrenated phenol (product Q) reacted with 50 parts of formalin and 4 parts of ammonia. 30 parts of the product is reacted with 70 parts of phenol and 90 parts of formalin.

The laminates whose properties are reported in Table V below are prepared as follows. 5 Mil. absorbent Kraft paper is impregnated by the dip and squeeze method to give a resin content of 48 to 51 % with a volatile content of 2.5 to 5.0 percent after drying.

The paper is unwound against light brake tension and run into a bath of varnish under a roll with sufficient immersion to give adequate penetration of the resin under the conditions of drying and machine speeds available.

The saturated paper is taken from the bath and passed through the nip of a pair of heavy polished steel rolls. The gap between the rolls is pre-adjusted with feeler gauges (from the out running side of the nip). Each side is independently adjustable to allow for variations in paper weight from side to side. A gap of 0.010 inch will give a resin content of very approximately 50 percent with 5 mil paper and the resin of Experiment 4 of Example 1.

The speed of drying is adjusted to give the required volatile content of 2.5 to 5.0 percent. Correct conditons can only be found by experience.

The required number of resin impregnated core sheets are assembled. The sheets are then placed between two polished stainless steel sheets, the paper being in contact with the polished surfaces. Fifteen sheets of 10 mil absorbent Kraft paper are then placed below the bottom steel sheet and another fifteen sheets placed above the top steel sheet. These 'pad' papers are used to give an equal pressure over the area of the laminate.

The press platens are brought up to the pressing temperature of 150°C. by applying steam before the assembly is placed in the press. A pressure of 1,000 psi. is immediately applied and maintained.

After pressing for 90 minutes at 150°C. and 1,000 psi. the steam is shut off and cooling water applied to the platens. When the laminate is just warm it is removed from the press. A pressing time of 90 minutes is suitable for laminates up to one-eighth inch thick. For thicker laminates the curing time is extended.

Examples 2 to 6 and 8 and 9 illustrate the effect of varying the proportion of styrene to phenol in the styrenated phenol. The dull surface finish of the laminates in Examples 5 and 6 can readily be overcome by the substitution of two sheets of face paper having good surface appearance in place of the inferior finish product. The electrical properties of all these Examples are good.

In Example 7, a styrenated cresol replaces the styrenated phenol used elsewhere.

Example 10 is not in accordance with the invention, as no styrenated phenol is used. The insulation resistance is inferior, and does not pass the criteria disclosed in British Standard Specification No. 1137 of 1966.

Examples 11 and 12 illustrate the effect of altering the amount of formalin used. It has been found that at least 75 parts of formalin per 100 parts of the phenol mixture are necessary for good results.

Examples 13 and 14 show that good results can be obtained with methods of preparation other than those described in paragraph B of Example 1.

Example 15 illustrates the use of cumyl phenol in place of styrenated phenol.

Examples 16 to 19 show the effect of altering the proportion of phenol to styrenated phenol.

EXAMPLE 20

This example illustrates the fact that removal of the acid catalyst used to form the styrenated phenol is essential in order to obtain satisfactory electrical properties. Two resins, designated M1 and N1, were prepared,

TABLE V

| Example | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|
| Resin Content (%) | 48.5 | 50 | 47.5 | 51 | 50.6 | 50.2 | 50 | 50 | 50.2 | 50.9 | 49.2 | 50.5 | 49 | 50.2 | 49.5 | 50.1 | 50 | 49.9 |
| Volatile Content (%) | 4.1 | 3.4 | 4.7 | 4.6 | 2.8 | 3.0 | 3.8 | 3.8 | 2.3 | 3.3 | 2.9 | 3.8 | 2.3 | 4.4 | 3.6 | 2.4 | 2.6 | 2.6 |
| No. of sheets | 17 | 17 | 17 | 17 | 17 | 17 | 17 | 34 | 17 | 17 | 17 | 17 | 17 | 17 | 17 | 17 | 17 | 17 |
| Thickness (in.) | .075 | .075 | .073 | .070 | .074 | .071 | .073 | .15 | .071 | .073 | .074 | .075 | .078 | .063 | .069 | .073 | .065 | .073 |
| Water absorption (mg) | 31.7 | 25 | 26 | 27.1 | 22 | 25.5 | 17.8 | 25.8 | 27.5 | 22.2 | 21.1 | 20.5 | 32.2 | 25.5 | 26.7 | 21.2 | 26.6 | 26.9 |
| Insulation Resistance (ohms) | $1.8 \times 10^9$ | $5.5 \times 10^9$ | $3.7 \times 10^{10}$ | $1.2 \times 10^{10}$ | $1.1 \times 10^{10}$ | $5.3 \times 10^{10}$ | $5.5 \times 10^{10}$ | $3.5 \times 10^9$ | $9.6 \times 10^8$ | $2.2 \times 10^9$ | $2.6 \times 10^9$ | $1.2 \times 10^{10}$ | $5 \times 10^9$ | $1.9 \times 10^9$ | $4.3 \times 10^{10}$ | $1.8 \times 10^9$ | $1.5 \times 10^9$ | $1.1 \times 10^{10}$ |
| Electric strength | >44 | >44 | >44 | >44 | >44 | >44 | >44 | >44 | >44 | >44 | >44 | >44 | >44 | >44 | >44 | >44 | >44 | >44 |
| Surface Appearance | Good | Good | Good | Dull | Dull | Good | Good | Good | Good | Good | Good | Good | Good | Good | Good | Good | Good | Good |
| Composition (parts by wt.) | | | | | | | | | | | | | | | | | | |
| Phenol | 70 | 70 | 70 | 70 | 70 | 70 | 70 | 70 | - | 70 | 70 | 70 | 70 | 70 | 40 | 50 | 60 | 80 |
| Cresol | - | - | - | - | - | - | - | - | 100 | - | - | - | - | - | - | - | - | - |
| Formalin | 105 | 105 | 105 | 105 | 105 | 105 | 105 | 105 | 100 | 225 | 80 | 105 | 105 | 105 | 105 | 105 | 105 | 105 |
| Styrenated Phenol (amount) | 30 | 30 | 30 | 30 | 30 | 30 | 30 | 30 | - | 30 | 30 | 30 | 30 | 30 | 60 | 50 | 40 | 20 |
| Styrenated Phenol (type) | P | P | R | S | V | T | Q | Q | - | Q | Q | Q | Q | U | Q | Q | Q | Q |
| Method of preparation of resin | B | B | B | B | B | B | B | B | B | B | B | X | Y | B | B | B | B | B |

The figures for water absorption are obtained by the procedure of Appendix F of British Standard Specification No.1137 of 1966.

The insulation resistance figures were obtained by the method described in Appendix D of British Standard Specification No.1137 of 1966.

The electric strength is the flatwise electric strength measured according to Appendix B of British Standard Specification No.1137 of 1966. The materials were not tested to destruction, and it will be seen that all comfortably passed the requirements of the B.S. Specification.

resin N1 being prepared in accordance with the process of this invention.

Resin M1

| Formulation | Parts by weight |
|---|---|
| Phenol | 84 |
| Styrene | 16 |
| Concentrated Sulphuric Acid | 0.25 |
| 0.91 Ammonia | 7 |
| Formalin (37% w/w) | 110 |
| Industrial Methylated Spirits | 104 |

METHOD

Charge phenol and sulphuric acid to still. Heat to 90°C. and add the styrene over a period of 50 minutes. Raise the temperature to 120°C. over 30 minutes. Cool down to 60°C. Add formalin and ammonia. Take to reflux and reflux for 70 minutes. Vacuum distil to 92°C. and add solvent.

Resin N1

Styrenated Phenol.

| Formulation | Parts by weight |
|---|---|
| Phenol | 436.66 |
| P. Toluene-Sulphonic Acid | 1.25 |
| Styrene | 520 |
| Soda Ash | 0.25 |
| Hot Water | 5 |
| Wash Water | 500 |

METHOD

The phenol and para toluene sulphonic acid were charged into a still and heated to 130°C. Add the styrene gradually over 2 hours. Heat to 135°C. and keep temperature at 135°C. for 30 minutes. Cool to 70°C. and add the soda ash solution. Cool to 20°C. and add the wash water and wash. Stop the stirrer, allow to settle and remove the upper aqueous layer.

| Formulation | Parts by weight |
|---|---|
| Phenol | 70 |
| Styrenated Phenol | 30 |
| Formalin (37% w/w) | 110 |
| 0.91 Ammonia | 3.85 |
| Industrial Methylated Spirits | 104 |

METHOD

Charge phenol and styrenated phenol to still, stir 3 minutes. Add formalin and ammonia. Take to reflux and reflux for 1 hour 45 minutes.

Vacuum distil to 95°C. and add the solvent.

Resin Properties

| | Resin M1 | Resin N1 |
|---|---|---|
| Gel time at 130°C. | 16 min. 45 sec. | 18 min. 10 sec. |
| Viscosity at 25°C. | 32 cs. | 32 cs. |
| S.G. at 15°C. | 1.018 | 1.018 |

A COMPARISON OF LAMINATE PROPERTIES

A 5 mil absorbent Kraft paper was impregnated with Resin M1 and dried for 5 minutes at 125°C. Seventeen sheets of the resin impregnated paper were laminated at a pressure of 1,000 psi. and at a temperature of 150°C. for 90 minutes. The laminate was then cooled before removal from the press.

Resin N1 was then processed under identical conditions.

| Laminate Properties | Resin M1 | Resin N1 |
|---|---|---|
| Thickness of Laminate ins. | 0.074 | 0.074 |
| Resin Content % | 50.7 | 49.4 |
| Volatile Content % | 2.42 | 3.6 |
| Water Absorption mg. (after 24 hrs. immersion at 23°C.) | 35 | 20 |
| Insulation Resistance ohms. (after 24 hr. immersion in water at 23°C.) | $2.7 \times 10^9$ | $1.42 \times 10^{10}$ |
| Power Factor at 1 Mc/s tan d. | 0.0316 | 0.0309 |
| Power Factor at 1 Mc/s tan d. (after 24 hr. in water at 23°C.) | 0.0437 | 0.0340 |
| Permittivity at 1 Mc/s. | 5.62 | 5.42 |
| Permittivity at 1 Mc/s. (after 24 hr. in water at 23°C.) | 5.82 | 5.42 |

Water absorption and Insulation tests were conducted according to British Standard Specification No. 1137 of 1966.

These results show that Resin N1 gives better properties than Resin M1.

The lower properties of Resin M1 are due to the acid catalyst remaining in the product.

The use of varying proportions of styrenated phenol to phenol makes it possible to produce at will resins and laminates having widely differing proportions. The resins are easy to formulate and work with, due partly to the plasticising effect of the styrenated phenol.

I claim:

1. A process for forming a laminate, which process comprises
   a. reacting a styrene with a phenol in the presence of an ionic catalyst to prepare a styrenated phenol,
   b. water washing the styrenated phenol,
   c. mixing the washed styrenated phenol with a phenol selected from the group consisting of phenol, cresol and xylenol, and an aldehyde, the weight ratio of phenol to styrenated phenol in the mixture being 95:5 to 30:70,
   d. reacting the mixture of the styrenated phenol, the phenol and the aldehyde in the presence of a volatile alkaline condensation catalyst to for a resin condensation product,
   e. impregnating fibrous sheets with the resin condensation product thus obtained, drying the impregnated sheets, assembling a plurality of the dried sheets and heating the assembled sheets under pressure to form the laminate.

2. A process as claimed in claim 1 wherein the aldehyde is formalin, the proportion of formalin to the total combined weight of phenol and styrenated phenol being from 75:10 to 225:100 by weight.

3. A process as claimed in claim 1, wherein the proportion of the phenol to the styrenated phenol is from 80:20 to 20:40 by weight.

4. A process as claimed in claim 1 wherein the styrene is selected from the group consisting of styrene, α-methyl styrene and vinyl toluene and is reacted with the phenol selected from the group consisting of phenol, cresol and xylenol in a weight ratio of styrene to phenol of 50:100 to 300:100.

5. A process as claimed in claim 4, wherein the weight ratio of styrene to phenol is 100:100 to 160:100.

6. A process as claimed in claim 1, wherein the condensation product is recovered by heating the resin product under reduced pressure.

7. A process as claimed in claim 6, wherein subsequent to heating the resin condensation product, an organic solvent is added thereto to form a varnish.

8. A laminate prepared in accordance with the process of claim 1.

* * * * *